United States Patent [19]

Jones et al.

[11] 3,914,730

[45] Oct. 21, 1975

[54] MOVING WINDOW SONAR DISPLAY SYSTEM

[75] Inventors: Charles H. Jones, Murrysville; Peter N. Wolfe, Pittsburgh, both of Pa.

[73] Assignee: Westinghouse Electric Corporation, Pittsburgh, Pa.

[22] Filed: Mar. 18, 1974

[21] Appl. No.: 452,316

[52] U.S. Cl. ............................... 340/3 R; 340/6 M
[51] Int. Cl.² ......................... G01S 9/66; G01S 7/62
[58] Field of Search ........................... 340/3 R, 6 M

[56] References Cited
UNITED STATES PATENTS

| | | | |
|---|---|---|---|
| 2,995,725 | 8/1961 | Kliever et al. | 340/3 C |
| 3,142,032 | 7/1964 | Jones | 340/6 R |

*Primary Examiner*—Richard A. Farley
*Attorney, Agent, or Firm*—D. Schron

[57] ABSTRACT

The invention provides a sonar system having a moving window display of the sonified area in which a single broad beam projecting transducer is employed to sonify a desired area. A plurality of line focus receiving transducers are used to receive signals from adjacent strips of the sonified area, and the signals received from each transducer are amplified, detected and sampled. A sampling switch is employed to sequentially sample each detector channel $R_E$ times, where $R_E$ represents the number of range elements. The sampled signals are then stored in a magnetic storage device, preferably a magnetic disc. The signals from a single sonar pulse are stored in groups, equal in number to the number of receiving transducers, at nonadjacent locations on the disc track, and the signals corresponding to equal range elements from previous and subsequent pulses are stored at adjacent locations in the order received. The disc rotates $360°\pm\phi$ during one picture interval to provide the moving picture display on a cathode ray tube electrically connected to a read head on the magnetic storage means.

9 Claims, 11 Drawing Figures

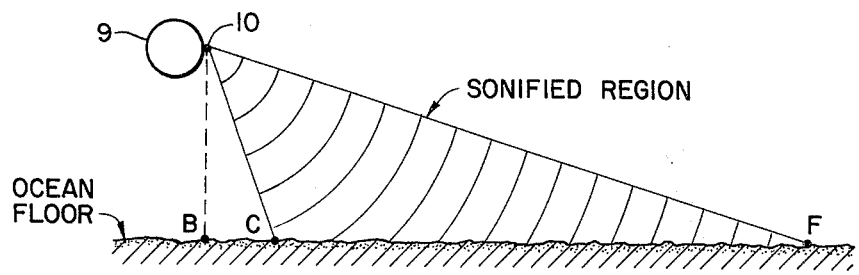
Fig. 1a
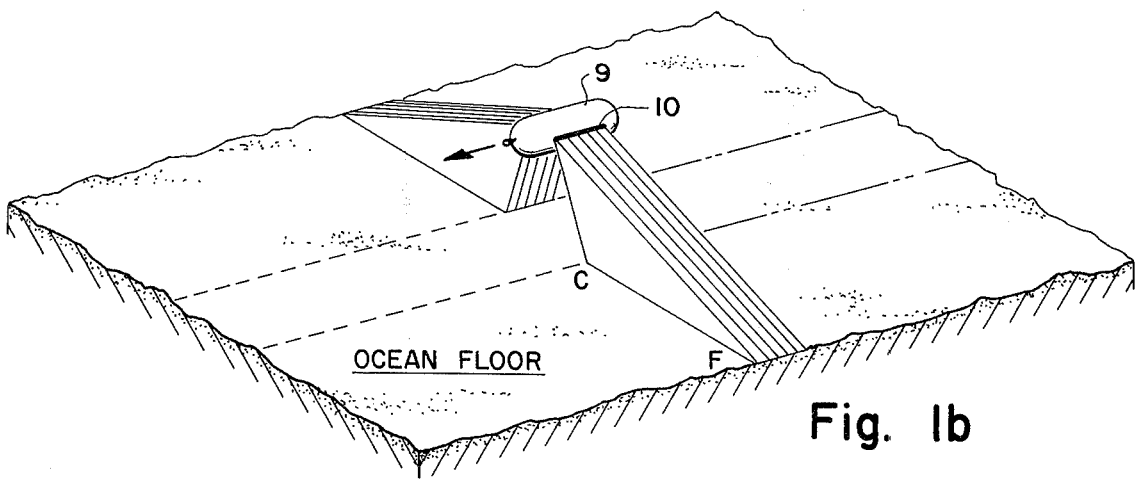
Fig. 1b
Fig. 3

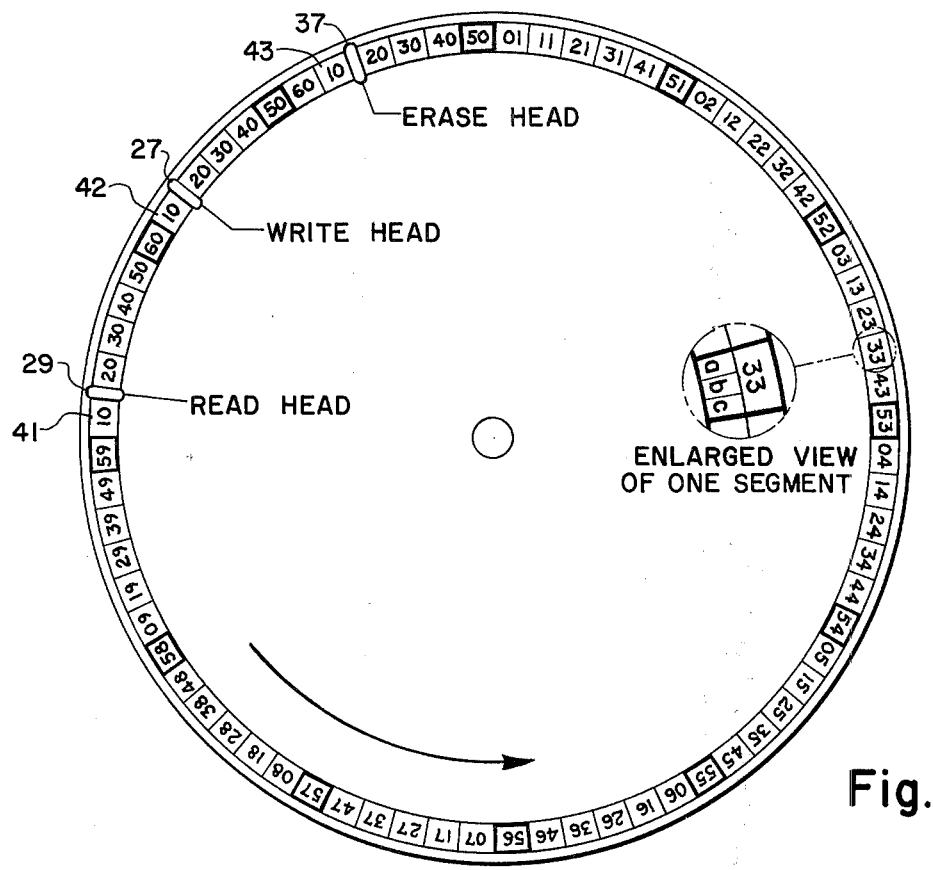

MOVING WINDOW SONAR DISPLAY SYSTEM

FIELD OF THE INVENTION

The present invention relates to a high resolution sonar system, and, in particular, to a system for processing and displaying sonar signals on a cathode ray tube in the form of a moving window.

BACKGROUND OF THE INVENTION

Sonar systems capable of obtaining high resolution displays of the ocean bottom have been developed utilizing line focus transducers. See, for example, U.S. Pat. No. 3,742,436. These systems employ a single transmitting arc transducer which focuses energy on a strip of the ocean bottom at right angles to the direction of the tow of the vehicle carrying the sonar transmitter. A similar line focus transducer is adapted to receive a signal from the same sonified strip of ocean bottom. The output signal from the receiving transducer is processed and recorded on a facsimile type device to provide composite pictures of the sonified segments of the bottom.

The use of facsimile devices for recording composite pictures, however, has the disadvantage of producing a large amount of hard copy of which only a small portion contains useful or meaningful information. Furthermore, facsimile paper has a low contrast ratio and a low dynamic range which does not permit obtaining pictures of a quality that are obtainable with a cathode ray tube or standard photographic film. Additionally, the use of facsimile-type recording devices requires a slow vehicle tow because only a single line-focus receiving transducer can be utilized with facsimile equipment.

The use of cathode ray display tubes has been proposed for use with line focus sonar transducers to achieve high quality pictures of the sonified areas. See, for example, U.S. Pat. No. 3,142,032. These systems incorporate the feature of a moving picture which provides a display that is analogous to looking through the bottom of a glass-bottom boat. In order to utilize the slow scan sonar signals on a fast scan cathode ray tube, however, it has been found necessary to convert the received analog signals to digital form, convert the stored signals back to analog form, and then record the analog signals on a magnetic media for replaying at the faster scan rate required by the cathode ray device. In these systems, the slow scan signals are converted to fast scan by storing digital signals and reading them at a fast rate for writing them onto a magnetic storage means. The compressed sonar signal obtained by sampling a selected portion of the returning signal is placed on the storage device and represents a display line of the cathode ray unit. By adjusting the synchronization of the scanning of the CRT unit, the picture can be made to move.

While this system provides a desirably high resolution moving picture, it requires digital storage of the received sonar signal and reconstruction necessitating complicated circuitry for proper registration of associated signals on the storage device. Moreover, these systems are limited to short ranges and to slow vehicle tow speeds. More importantly, they are limited to single beam sonar systems.

Accordingly, it is an object of the present invention to provide a sonar system capable of producing high resolution moving pictures with a cathode ray display means. A further object of the present invention is to provide high resolution moving pictures from a multiple-beam side-looking sonar system at substantially higher vehicle tow speeds and longer ranges than are presently obtainable with prior art devices. It is another object of the present invention to provide means for high resolution moving window displays from multiple-beam systems without the need for any digital storage.

SUMMARY OF THE INVENTION

The present invention provides a system for storing sonar information on a magnetic storage means capable of storing a complete cathode ray picture and displaying the stored picture as a moving window. The sonar system of the present invention is capable of displaying both radial beam-type and parallel beam-type side-looking sonar signals.

Generally, the sonar system of the present invention includes a broad beam projecting or transmitting transducer typically mounted on a tow vehicle. The transducer produces, for example, a pulse of 33 microsecond duration at a frequency of 1,000 KHz. A transmitter of this type is capable of sonifying an area of ocean bottom at right angles to the tow vehicle having a slant range of 500 inches. An area 6 inches in width is sonified by a single beam projecting transducer.

In order to achieve high resolution of the sonified areas, a plurality of receiving, line-focus transducers are focused on adjacent segments or strips of the sonified area. For example, to image a sonified area having a slant range of 500 inches, 6 receiving transducers, each having a one inch resolution, are simultaneously focused on adjacent strips of that area. The receiving transducers receive signals from their associated sonified segments and these signals are amplified and detected. The detector circuits of each of the associated transducers are electrically connected to a sampling switch which sequentially samples the output of each detector ($R_E$) number of times between two successive sonar pulses. Each sampling represents one element of range resolution. Preferably, the number of range resolutions is eequal to the number of vertical elements in the cathode ray display unit.

Thus, for example, with a maximum range of 500 inches, a minimum range of 250 inches, and a range resolution of 1 inch the number of range elements ($R_E$) to be displayed would be 250. Employing a rectangular cathode ray tube of conventional shape having an aspect ratio of 3 to 4, it would be desirable to display about 200 strips of ocean bottom. To allow for the cathode ray tube line retrace time, a total of about 220 lines would be used.

The received signals can be processed in a number of ways and placed onto a magnetic storage means such as a magnetic drum, disc, or tape loop which is capable of storing one complete picture. The stored picture is then displayed on the cathode ray tube (CRT). As new signals are received corresponding to newly sonified segments or strips on the ocean bottom, they are added to the magnetic storage to replace the signal information representing the oldest sonified strips stored in the storage means.

One method for processing the received signals is to sample each of the received and detected signals in rapid sequence in a time which is short compared to a transmitted pulse width (e.g., 33 $\mu$s). If 220 horizontal picture elements are used, then each channel will be sampled in $33/220 = 0.15$ $\mu$s. Therefore, where six receiving transducers are used, 0.90 $\mu$s will be required to sample all six channels. Then, 33 $\mu$s later, the six channels are sampled again. The output from the sampler (or multiplexer) is fed to the magnetic storage unit.

The output signals from the sampling switch are applied to the write head of a magnetic storage device such as a magnetic disc, magnetic drum, or continuous loop of magnetic tape. In a magnetic disc, for example, the received signals from a single sonar pulse are stored in $N_B$ groups, where $N_B$ is the number of receiving transducers, at nonadjacent locations about the periphery of the storage disc. However, signals corresponding to equal ranges from both previous and subsequent sonar pulses are stored adjacent to each other so that during one revolution of the storage device the read head will read all like stored range elements. Thus, the first range elements of each succeeding sonar pulse are located next to each other in successive fashion along the periphery of the storage means. Second range elements for each succeeding sonar pulse are positioned adjacent to each other at another location along the periphery of the storage device. Since more than one receiving transducer is used, the received signals from each of the $N_B$ beams (sonified strips or segments) are stored adjacent each other at each range element. On a completely filled storage device, the newest signals replace the oldest.

By rotating the magnetic disc at a rate either slightly slower or slightly faster than the picture rate, a "moving window" display is obtained. Each successive picture moves $N_B$, where $N_B$ is equal to the number of receiving transducer beams. In the case of a fast rate of rotation, the disc rotates $360°+\phi$, during one picture interval. In the case of a slow rate of rotation, the disc rotates $360°-\phi$ during one picture interval. In a horizontal line scan display $\phi$ is equal to the space occupied by $N_B$ picture elements. In a vertical line scan display, $\phi$ is equal to the space occupied by $N_B$ vertical lines. In a long range sonar system, only one new line is generally shown on every picture element so that $\phi$ is the space occupied by one line.

Thus, in a horizontal line display where the storage disc rotates $360°+\phi$, the CRT lines are scanned from left to right (i.e., from old information to new information). Where the storage disc rotates $360°-\phi$, the CRT lines are scanned from right to left (i.e., from new information to old information). Moreover, since there is an appreciable dead time after a sonic signal is transmitted before there is any retrun from a minimun range of interest, this time can be used to effect the vertical retrace of the CRT display.

A second means can be employed for processing the signals for storage on a magnetic disc, magnetic drum, or magnetic tape in such a way that a moving picture display can readily be produced from the magnetic storage media.

In the time between two transmitted signals all of the received signals from the $N_B$ beams are amplified, detected, and stored in $N_B$ storage means. A preferred storage means is a bucket brigade circuit. Then, during the dead time that occurs between the time the projector emits a pulse of sonic energy and the time energy is received from regions at minimum range, the stored information is rapidly read out of the bucket brigade circuits and onto the magnetic storage.

The information is placed on the magnetic storage in such a manner that vertical lines are scanned rather than horizontal. With $N_B$ receiving beams, $N_B$ pictures can be displayed between successive transmitted pulses. For example, in a system with a maximum range of 5,000 inches, pulses are transmitted at a rate of 6 per second. If the sonar has 10 beams, then pictures can be displayed at a rate of 60 per second. With this picture rate, conventional TV picture tubes can be used for display, because there will be no flicker.

The two systems described are applicable to oblique-look sonar as well as side-look sonar. In oblique-look sonar the strips of the ocean bottom which are not at right angles to the bearing angle are scanned. The received signals can be processed and stored on a disc in exactly the same manner as for a multibeam side-look system, but they are displayed on a CRT that has a raster shaped like a parallelogram rather than a rectangle. Consequently, an undistorted view of the bottom results.

Other advantages of the present invention will become apparent from the following detailed description taken in connection with the accompanying drawings of a presently preferred embodiment.

BRIEF DESCRIPTION OF THE DRAWINGS

FIG. 1a is a pictorial representation of a tow vehicle in which a side-looking sonar system is used to sonify an area of ocean bottom;

FIG. 1b is a pictorialization of the sonification of an area of ocean bottom;

FIG. 3 is a pictorialized planar view of the ocean bottom sonified and segmentized by receiving transducers and sampling switch, of FIG. 2, as it corresponds to an illustrative view of the display means;

FIG. 4 is an enlarged view of a magnetic disc storing means showing representative storage locations and corresponding to the view shown in FIG. 3;

FIGS. 6a and 6b represent cathode ray tube elements corresponding to storage locations and ocean bottom;

DETAILED DESCRIPTION OF THE INVENTION

Figure 2:
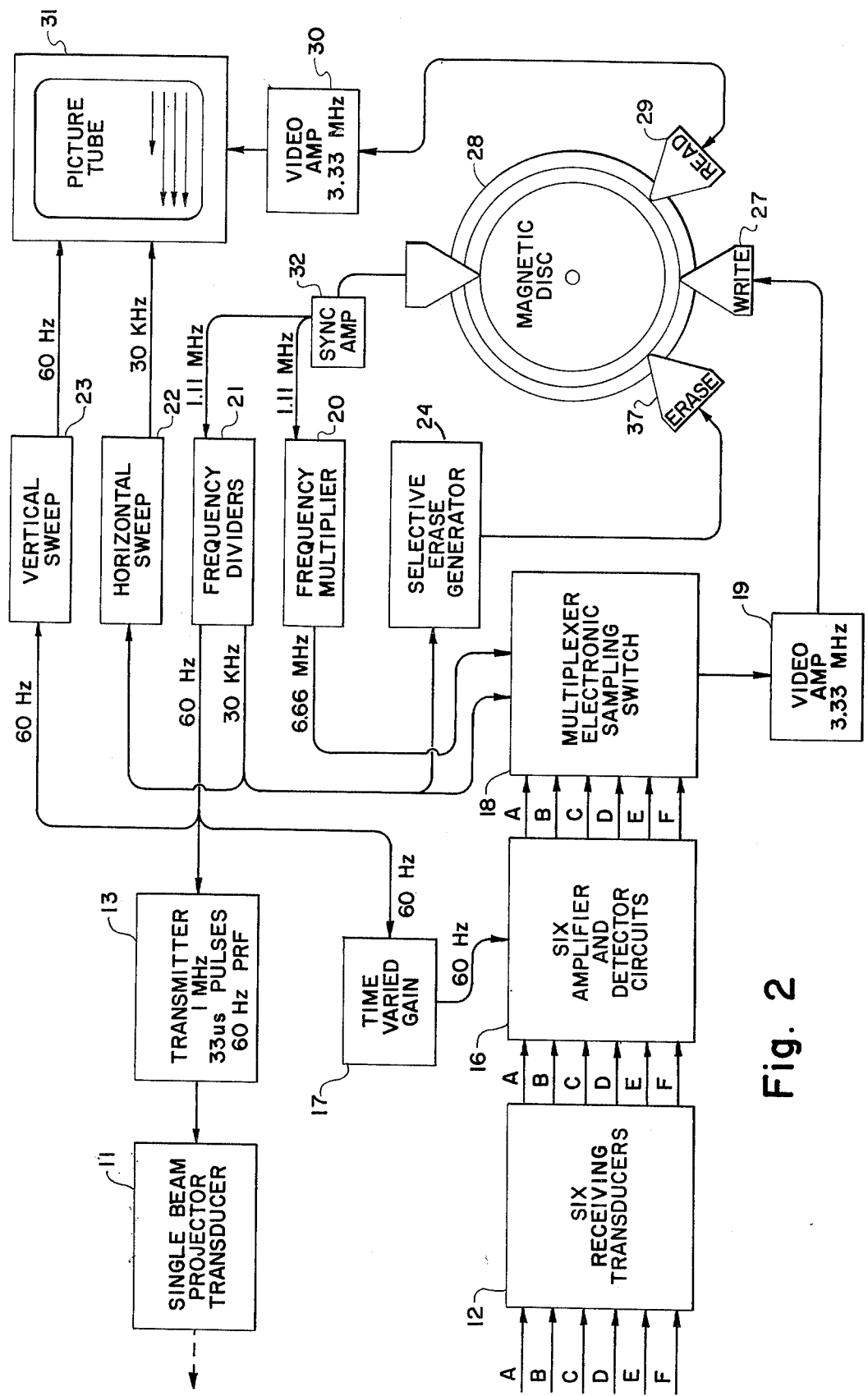
FIG. 2 is a block diagram of the basic components of the sonar system of the present invention.

With reference to FIGS. 1a and b, a tow vehicle 9 having a set of transmitting and receiving transducers 10 is towed through ocean 8. Transducer set 10 comprises a single beam projecting transducer 11 (FIG. 2) capable of sonifying a portion of the ocean bottom at right angles to a direction of travel of tow vehicle 9. The slant range of a typical projector transducer is about 500 inches with a beam width of about 6 inches. Transducer set 10 also includes a plurality of line-focus receiving transducers 12 simultaneously focused on adjacent portions of the sonified bottom. Transducers 12 are preferably of the type shown in U.S. Pat. No. 3,742,436, the subject matter of which is incorporated herein by reference. Typically, it takes approximately 16.7 milliseconds from the time the signal is transmitted from the transducer 11 to the reception of sonar signals from a slant range of 500 inches by transducers 12. The signals received by each transducer represent a narrow strip extending from point C to point F on the ocean floor.

Referring to FIG. 2, a system using a slow disc ($360°-\phi$) of the present invention is shown. The same components are applicable to a fast disc system ($360°+\phi$) except certain frequencies must necessarily be changed. The system shown in FIG. 2 includes a single broad beam projecting transducer 11 which is positioned on the side of tow vehicle 9. Transducer 11 can have a frequency of 1 MHz and length of about 5 inches to sonify a strip 6 inches wide at a slant range of 500 inches. A transmitter circuit 13 is used to supply the desired signal to transducer 11. Typically a signal of 33 microsecond duration is transmitted every 1/60 of a second by transducer 11.

Reflected signals are received by $N_B$ line-focus transducers. As shown in FIG. 2, six line-focus transducers, $12a, 12b, \ldots 12f$, are each approximately 30 inches in length with a one wavelength width simultaneously focused on adjacent strips of the sonified ocean floor to provide six input signals to the system. However, the number of line focusing receiving transducers 12 is optional and is selected to divide the sonified area into a like number of columns thereby increasing the resolution in the direction of tow and/or achieving higher vehicle tow speeds.

Each of the receiving transducers $12a, b \ldots f$ are connected to an associated amplifier and detector circuit $16a, b \ldots f$. To each of the amplifier circuits is supplied a time-varied gain by circuit 17 synchronized by a 60 Hz signal derived from a synch-track of the magnetic storage disc to compensate for the change in signal strength as a function of range. Each of the amplifier-detector channels is connected to a multiplexer or sampling switch 18. Sampling switch 18 samples each channel in sequence $R_E$ times between successive transmission pulses. $R_E$, therefore, represents the number of range elements or range resolutions of each of the received sonar signals and corresponds to the vertical elements on the CRT display means.

For a range resolution of one inch, for example, the transmitted pulse length must be 33 $\mu s$ and each of the horizontal lines of the picture must be scanned in 33 $\mu s$, preferably starting at the bottom of the CRT display and progressing upwardly, and thus requires a horizontal sweep frequency of 30 KHz provided by circuit 22. The time associated with each picture element depends on the number of picture elements per line ($R_E$). For example, where there are a total of 220 elements per line (200 of which are visible), the time associated with each picture element is 0.15 $\mu s$. The picture elements are then displayed at a 6.67 MHz rate, and the video frequency required of the storage disc and its associated input and output amplifiers is 3.33 MHz. Thus, sampling-switch 18 samples each of the six received signals in sequence at 0.15 $\mu s$ intervals for storage of the sampled information on the magnetic disc. Every 33 $\mu s$ new range information is received on each of the six channels; these signals are sampled and recorded on the disc in a time of $6 \times 0.15 \mu s = 0.9 \mu s$.

The output signal from sampling-switch 18 is amplified by video amplifier 19 and applied to a stationary write head 27 of magnetic storage unit 28. Preferably, magnetic storage 28 is a magnetic disc having at least two tracks. The outer track of a 12-inch magnetic disc is capable of storing a complete video picture having at least 125,000 picture elements.

The inner magnetic track of disc 28 is provided with a permanently stored 1.11 MHz synchronizing signal which as a period of 0.90 $\mu s$, which is equal to the time required to sample each of the six beam signals. This signal is amplified by amplifier 32 and is multiplied by a factor of six in frequency multiplier 20 to obtain a 6.66 MHz signal that sets the sampling rate in unit 18. A set of frequency divider circuits 21 produces a 30 KHz and a 60 Hz output. The 30 KHz sets the line frequency and is used to synchronize the horizontal sweep frequency on CRT display 31. The 30 KHz is also used to reset the sampling-switch 18 and to initiate a 0.9 $\mu s$ erase signal at a 30 KHz rate in selective erase generator 24. The 60 Hz signal of divider circuits 21 is used to synchronize the vertical sweep 23 of the CRT display 31 and to synchronize the pulse of 1 MHz energy from transmitter 13. The 60 Hz signal is also used to synchronize the time varied gain circuit 17.

During one revolution of disc 28, stationary read head 29 connected through amplifier 30 to the control grid of CRt unit 31 reads information stored on the disc which was received during that 1/60 of a second as well as information stored from previous sonar pulses to provide a complete video picture of the sonified area. The video display, for example, contains 250 range elements or visible lines with 220 elements per line (200 of which are visible on the display). The magnetic disc, therefore, must contain information for at least 220 elements, 9% of which information is lost in horizontal retrace time. The vertical retrace time occurs during the reverberation time, or the time it takes a signal to go out and return from a portion of the ocean floor that is a minimum range (Point $c$, FIG. 1a).

In order to explain the method by which the received sonar signals are stored on disc 28 and displayed on CRT 31, a pictorialized view of a sonified area of ocean bottom is shown in FIG. 3. For purpose of clarity, only three line-focus receiving transducers 12 are employed and disc 28 rotates $360°+\phi$ rather than $360°-\phi$ as described with reference to the system shown in FIG. 2. In this illustrative embodiment, a low resolution is obtained since sampling-switch 18 samples each detector channel only 12 times between each sonar pulse; i.e., $R_E = 12$. Further, display means 31 is provided with only 15 visible vertical columns.

Notwithstanding the limited number of range elements and vertical display columns of the illustrative embodiment, high resolution systems of the present invention operate in an identical manner.

Therefore, with reference to FIG. 3, a view of the sonified ocean bottom is shown in segmentized form which corresponds to the visual display elements of a CRT unit and the storage locations of a magnetic disc. When tow vehicle 9 is at position 1 of FIG. 3, transducer 11 transmits a first sonar pulse that sonifies an area of the ocean bottom bounded representatively by $X_1, X_2, X_3$ and $X_4$. The signals returning from this area are received by transducers $12a, 12b$ and $12c$ which are focused on the bounded area to each received signals from adjacent, equal, strips A, B and C. Thus, each transducer receives signals from only a portion (strip) of the total area sonified.

The output of each transducer is fed to its associated amplifier-detector circuit 16. The output from each detector channel is sampled by sampling-switch 18 twelve times during each sonar pulse. The first three samples occur during the time it takes a signal to be transmitted to and returned from a point of minimum range (point C of FIG. 1a). These first three samples are designated "0"; and, as used herein, the first number represents the pulse number and the second number represents the range element. Generally, the information received during the first three samples of each detector channel is stored on disc 28; however, the signal are not visually displayed, since it is preferred to use this time to provide the necessary vertical retrace of the display unit. Moreover, during this time that it takes the signal to leave the transmitter and return from the minimum area, no useful information is obtained.

With reference to FIG. 4, the signals detected and sampled during the first sampling of each channel are stored at adjacent locations 10A, B and C on disc 28 at position 41. The signals detected and sampled during the second sampling are stored at adjacent locations 10A, B, C at position 42 of disc 28. Position 41 and 42 are displaced from each other by the total number of columns associated with a horizontal line. In this case, 15 columns are visually displayed. The signals obtained during the third sampling are stored at locations 10A, B, C at position 43 of disc 28.

The fourth range elements or the first visible elements, are sampled and provide signals 11A, B and C which are stored at locations 11A, B and C of disc 28. The second visible element 12A, B and C are sampled and stored at storage locations 12A, B and C of disc 28 and so on through range elements 19A, B and C. As can be seen from FIGS. 4 and 5, each of the range elements 10, 10, 10, 11, 12 . . . 19 ABC are stored at nonadjacent equally-spaced locations around the periphery of disc 38. After storage of range elements 19 ABC signal information, a second pulse is transmitted, During the time required for transmission and reception of a signal from the nearest elements, sampling switch 18 has added information 20A, B and C three times to the disc. The first sampled signal during the second pulse 20A, is positioned adjacent first sampled signal 10C (from the first pulse) on the disc. This position is 360° plus the distance of one segment. One segment is the space occupied by $N_B$ picture elements; in this case $N_B$ is equal to 3. The first visible range elements of the second pulse 21A, B and C are sampled and placed adjacent each other and adjacent to the information from the first range of the first sonar pulse, 11A, B and C on the disc. The second range elements 22A, B and C of the second pulse are placed adjacent to the second range elements 12A, B and C of the first pulse and so on through the ninth range. This process is repeated for the third through fourth pulses. By the time the vehicle has arrived at position 5, signals from elements 11A, B and C through 49A, B and C would all be recorded on magnetic disc 28. In a 360°+$\phi$ revolution of the disc, information from areas 51A, 51B, 51C through 59A, 59B and 59C are recorded. During this same revolution a complete picture is displayed as represented by FIG. 6a.

In order, however, for a subsequent pulse sonification to be received and recorded, the previously stored oldest information on the disc must be erased. Accordingly, an erase pulse three elements wide is generated in selective erase generator 24 and applied to erase head 37. Erase head 37 erases the data stored at location 00A, 00B, 00C through 09A, 09B, 09C obtained by sonification of the area immediately ahead of area $X_1-X_4$, while write head 27 is recording range element data 60A, 60B, 60C through 69A, 69B, 69C on the corresponding locations of the previously erased data. The placement of new data is easily seen with reference to FIGS. 4 and 5 which shows the angular position of the information on the disc.

Figure 5:
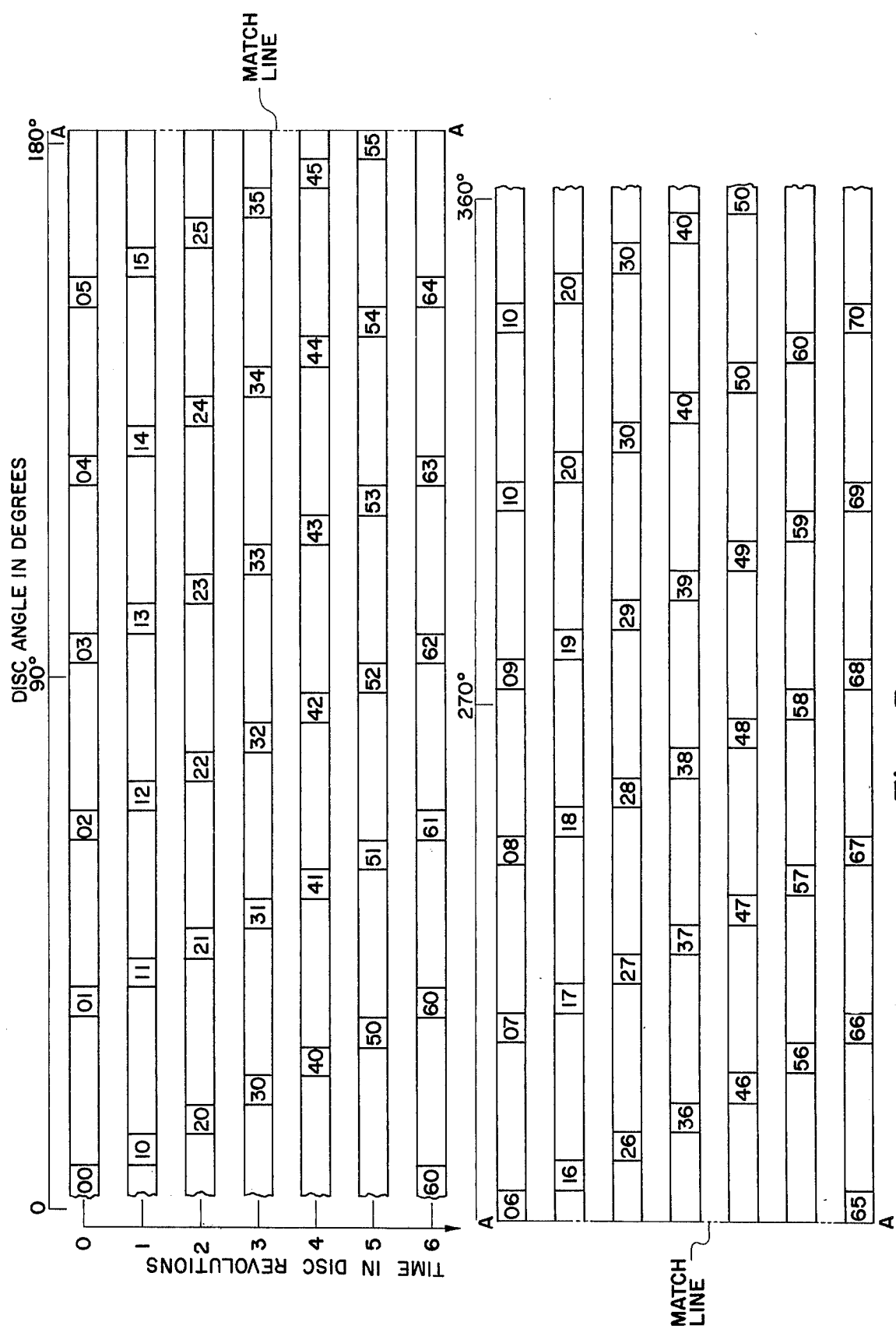
FIG. 5 is a planar representation of the angular position of the storage locations of the disc shown in FIG. 4.

With reference to FIGS. 4 and 5, disc 28 has 71 storage element locations, each of which comprises three picture elements for a total capacity of 213 picture elements. Approximately one-fourth of these elements contain no useable picture information because of the required time to achieve minimum range reception. Accordingly, this time is used for vertical retrace of display means 31. Moreover, with reference to FIGS. 6a and b which show the visible picture elements displayed after two different consecutive transmitted pulse times, elements 01 through 09 are not displayed because of the horizontal retrace time required by the CRT unit 31. Because 71 rather than 72 storage segments are provided about the circumference of disc 28, new information can be placed at the desired locations while maintaining a constant sampling rate on all three channels and a constant rotational rate of disc 28.

Accordingly, FIG. 6a represents the picture elements that are displayed during one field and FIG. 6b represents the picture elements displayed on the following field. Corresponding numbers relate to both the storage locations as shown on FIG. 4 as well as the illustrated planar view of FIG. 3. Thus, in one revolution of disc 28, information relative to areas 51A, 51B, 51C through 59A, 59B and 59C are recorded at position 5 of the tow vehicle 9. During this same revolution of the disc, read head 29 picks up signals from elements 11 through 59A, B and C and displays them on cathode ray picture tube 31 in a manner shown in FIG. 6. Picture elements are swept first 11A, 11B, 11C, 21A, 21B, 21C, 31A, 31B, 31C, 41A, 41B . . . 51B, 51C. The next horizontal sweep displays 12A, 12B, 12C, 22A, 22B, 22C, 23A, . . . 52A, 52B, 52C. The third line swept is 13A, 13B, . . . 53B, 53C. The ninth and last line swept is 19A, 19B, 19C, 29A, 29B through 59C. In other words, the horizontal lines of the picture displayed on CRT 31 are swept from left to right starting at the bottom of the picture and progressing from the bottom of the picture to the top. With reference to the next field of display, FIG. 6B, a subsequent pulse is sent out and elements 21 A, B, C through 69A, B, C are displayed while elements 61A, B, C through 69A, B, C are being recorded and elements 01A, B, C through 09A, B, C simultaneously erased.

In applications where the maximum slant range is 1000 inches the time required to transmit and receive a signal is 1/30 sec., and, therefore, a transmitted pulse repetition rate of 30 per second is normally used. If the fields are presented on a conventional TV picture tube with a short persistance phosphor at a rate of 30 per second an objectionable flicker will result. This problem may be overcome by employing a line interlace where all of the odd lines of the picture are presented in one frame in 1/60 second and all of the even lines in the next 1/60 second. By employing two write heads 180° apart, the sonar information can be recorded on the disc in such a manner that a single read head will read off first the odd lines 01A, B, C through 51A,B,C 03A,B,C through 53A,B,C, 05A,B,C through 55A,B,C, 07A,B,C through 57A,B,C, 09A,B,C through 59A,B,C, followed by the even lines 02A,B,C through 52A,B,C, 04A,B,C through 54A,B,C. 06A,B,C through 56A,B,C, and 08A,B,C through 58A,B,C. Consequently, the picture displayed is similar to that shown in FIG. 6a. and the next picture displayed is similar to FIG. 6b. The advantage of the interlace system is that the sonar range can be increased by a factor of two and the disc speed reduced by about a factor of two.

In practice, rather than utilizng three line focus receiving transducers, from six to ten are preferred. Sampling switch 18 rather than dividing the range elements into twelve range resolutions, 250 or more would be used. Sampling of each of the transducers would be achieved in a time determined by the range resolution required. Moreover, in order to achieve a low flicker high brightness picture, it would be preferable to include a pair of read heads positioned 180° from each other. This method of interlacing would require all odd lines presented to one head in 1/60 of a second and all even lines presented to the other head in 1/60 of a second. An electronic circuit is included to switch back and forth between one head and the other at the desired line rate. The order in which lines are displayed on a 655 line picture, for example, would be 1,329, 3,331, 5, 333, 7, 335, 9, 337, 11, 339, 13, 341 ... 325, 653, 327, 655, 2, 330, 4, 332, 6, 334, 8, 336, 10, 338, 12, 340, 14, 342, ... 326, 654, 328, 656. This interlacing would allow a higher display brightness level and would be practical if not interlace were employed.

In multiple beam sonar systems of the present invention having a range of more than 500 inches it is desirable to provide an intermediate storage means between the detected sonar signal and the magnetic disc. This makes it possible to display pictures at a rate of about 60 pictures per second even though it takes much longer than 1/60 second for the pulse of sonar energy to travel out to the maximum range and return to the receiving transducer.

To understand how such a system works a three-beam system with only 9 elements of range resolution as shown in FIG. 3 and described above will be discussed. In this example, the information from areas 0 through 49 has previously been received and stored on the magnetic disc. With the vehicle in the position shown, the transducers A, B, and C are receiving signals from strips 50a to 59a, 50b to 59b, and 50c to 59c. These signals are stored as they are received in three bucket brigade circuits. Then at an appropriate time they are rapidly read out of the storage unit one line at a time and onto the magnetic disc. Each picture shown on the CRT display has one old line of information omitted and one new line of information added. Every third field the new information from the three beams is transferred from the bucket brigade storage circuits onto the magnetic disc to replace the three oldest lines stored there.

Figure 7:
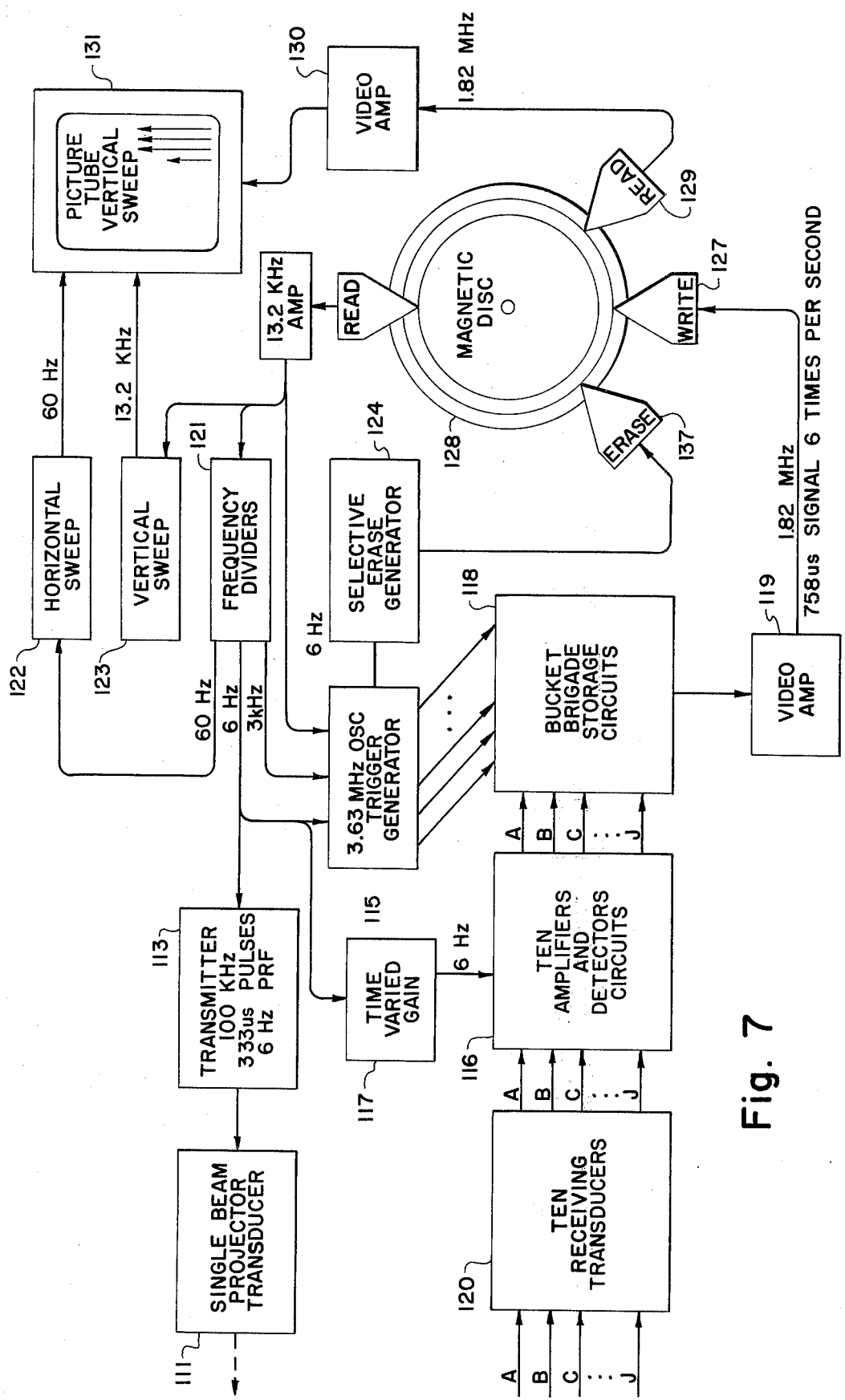
FIG. 7 is an alternative signal processing circuit for long range multiple beam sonar systems.

FIG. 7 illustrates a practical embodiment of such a system for a side-look sonar with a maximum range of 5000 inches and with ten receiving beams. The transmitted pulse width is 333 $\mu$s in order to achieve a range resolution of 10 inches. Consequently, every 333 $\mu$s each of the 10 beams receives information about a new range increment. Each received signal is amplified, detected, as described with reference to FIG. 9 and fed to a bucket brigade storage circuit.

A pulse repetition rate of 6 pulses per second is preferably employed to permit the transmitted signal time to go out to the maximum range and return before another pulse is transmitted. Ten receiving transducers 120, are employed each of which receives sonic energy from a strip 10 inches wide on the ocean bottom. In order to achieve a range rasolution of 10 inches a transmitter pulse length of 333 $\mu$s is used. The ten received signals are each amplified and detected in unit 116 and are then stored in the bucket brigade circuit 118. Every 1/6 sec. new information is received on all 10 channels and all the information stored in circuit 118 is sequentially transferred to disc 128.

Figure 8:
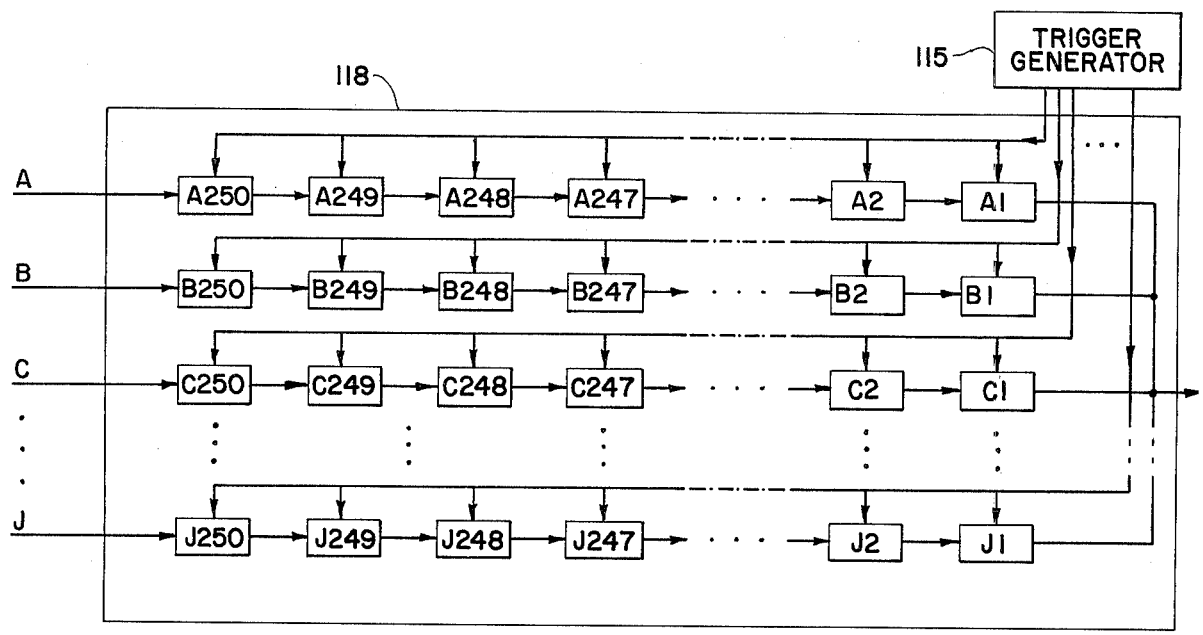
FIG. 8 is a block diagram of bucket brigade circuit 118 of the system shown in FIG. 7.

Referring to FIG. 8, a block diagram of suitable bucket brigade circuit is shown. In the present embodiment, circuit 118 consists of ten separate bucket brigade channels, one for each receiving transducer beam. Each channel contains 250 "buckets" or storage elements to store the 250 range elements of interest. Whenever a trigger signal is applied the information contained in each storage unit is shifted one element to the right. Since new information is received every 333 $\mu$s, the time between trigger pulses on reception is 333 $\mu$s. During the dead time after the transmitted signal (and before information has been received from the minimum range) the stored information is rapidly transferred out of the storage unit 118 and onto the storage disc 128. The signals are read out in the following order A1, A2, A3, ... A249, A250, then B1, B2, B3, ... B249, B250, then C1, C2, C3, ... C249, C250, ... and finally J1, J2, J3, ... J249, J250.

Between each group of 250 signals there is a dead zone equal to 25 sample intervals to allow time for vertical retrace on the display. Since picture elements are displayed at a rate of 3,630,000 picture elements per second the signals are read out of the bucket brigade storage at this same rate. Each new picture that is shown contains one new line and omits the oldest line that was previously displayed. The disc rotates (360°–$\phi$) for each icture display. The angle $\phi$ is the space occupied by one vertical line (275 picture elements). The inner track on disc 128 contains one sync pulse ever angle $\phi$. There are a total of 221 sync pulses on the circumference of the disc. Every 220 sync pulses a new picture is shown.

Thus, in this embodiment shown in FIG. 7, angle $\phi$ is equal to 1.63°. As disc 128 rotates, a 13.2 Hz signal is generated which is used to synchronize the vertical sweep circuit 123 for the CRT display 131. A set of frequency divider circuits 121 derives 3 KHz, 60 Hz and 6 Hz signals. The 60 Hz signal is used to synchronize the horizontal sweep circuit 122 of CRT display 131. The 6 Hz signal synchronizes the transmitted pulse in transmitter 113 and the time varied gain unit 117. Unit 115 includes a 3.63 MHz multivibrator circuit and a trigger generator circuit. Accordingly, while information is being received, each of the bucket brigade circuits is triggered every 333 $\mu$s (at a 3 KHz rate). After 250 pulses, 250 range elements will be stored in each of the ten strings of storage buckets. This information is read out by applying 250 3.63 MHz pulses to the first line, then 250 3.63 MHz pulses to the second line, etc., until the information from the tenth line has been read out and stored on disc 128. A 6 Hz signal is applied to the erase generator 124 so that the ten oldest lines stored on disc 128 are erased to provide space to write the series of signals transferred from bucket brigade storage 118. Since output signals from storage 118 are changed at a rate of $3.63 \times 10^6$ per second, a video amplifier with a top video frequency of at least 1.82 MHz is preferred.

The advantages of line interlaced pictures can be effectively utilized in the embodiment shown in FIG. 7. If, for example, an interlace ratio of two is employed, all of the odd lines of the picture can be presented in 1/60 of a second and all the even lines in the next 1/60 second. This has the advantage of reducing the rotational speed of the disc 128 by a factor of two without the need for additional read or write heads. The received and detected signals are stored in bucket brigade circuits 118 in the manner described above. Signals from beams A, C, E, G and I are read out of the storage 118 and onto the magnetic disc 128. When this method is employed it is desirable to have an even number of sonar receiving beams and an odd number of total vertical lines. For example, 221 lines or 219 lines should be employed rather than 220. In longer range sonar systems with a range greater than 1000 inches, it may be desirable to present two or more pictures during the time interval between two successive sonar pulses in order to avoid objectionable flicker. A sonar with a range of 5000 inches has a pulse repetition rate of about 6 pulses per second. In the system described with reference to FIG 2, disc 28 rotating at 60 revolutions per second can display a picture 60 times per second even though it requires 1/6 second or ten revolutions of the disc to record total information from one set of detectors for the entire range.

Figure 9:
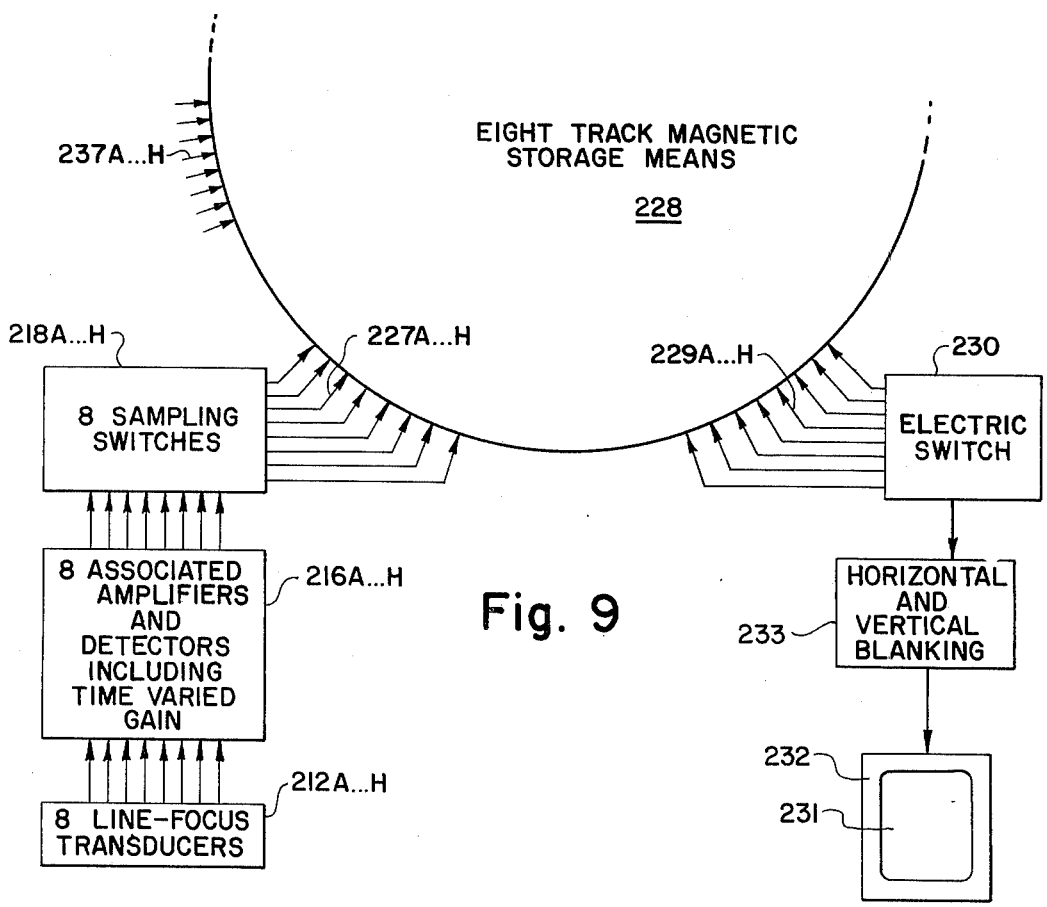
FIG. 9 is an alternative embodiment of the system shown in FIG. 2.

If the signals from each detector channel are sampled by separate samplers and recorded on a separate channel, then the video response of the disc can be reduced by a factor of $N_B$ and the disc diameter can also be reduced by a factor $N_B$. Such a system is shown in FIG. 9. The output signals from the $N_B$ read heads are then sampled in rapid sequence to derive a single video signal that is fed to the grid of the display tube after suitable blanking has been added. Thus, with reference to FIG. 9, eight line focus transducers 212A . . . H are connected to eight amplifier detector circuits having time varied gain 216A . . . H. Each of the amplifier detector outputs are sampled by an associated electronic switch 218A . . . H which feeds it signal to an appropriate writing head 227A through H for recording on the associated channel of an eight track magnetic disc 228. The signals from read heads 229A . . . H are sampled in rapid sequence by an electronic switch 230 to provide a single video signal that is fed to grid 232 of display means 231 after passing through horizontal and vertical blanking circuit 233. Accordingly, because of the 8 parallel channels, the sampling rate is one-eighth of what it would have been had a single channel been used.

While the present invention has been particularly described with respect to a magnetic disc, it is equally clear that a magnetic drum storage means or magnetic tape also is suitable for use for storing the sonar signals. Operation of the magnetic drum is analogous to the disc and requires substantially no further explanation. The magnetic tape, however, is preferably a closed loop system. In order to store a 3.33 MHz bandwidth signal from sampler switch 18, a tape speed of 400 inches per second is preferred. Presently, however, a tape speed of 400 inches is undesirable not only from the standpoint of breakage but for recordation purposes. Accordingly, a multiplexer circuit preferably would be utilized. For example, a 1 to 2 multiplex would provide two channesl of 1.6 MHz each, or a 1 to 10 multiplexer would provide ten channels each having a bandwidth of 333 Hz each.

The following table is a summary of the preferred system parameters of a short and long range sonar system in accordance with the present invention.

TABLE I

| | Short Range | Long Range |
|---|---|---|
| Range | 500 in. | 5000 in. |
| Receive Beams | 6 | 10 |
| Signal Processor | Multiplexer | Bucket Brigade Circuits |
| Display | | |
| Scan Direction | Horizontal | Vertical |
| Picture per second | 60 | 60 |
| Total Lines | 250 | 220 |
| Line Frequency | 30 KHz | 13.2 KHz |
| Elements per line | 200 | 275 |
| New lines every picture | 6 | 1 |
| Transmitter | | |
| Frequency | 1 MHz | 100 KHz |
| Pulse Repetition Rate | 60 Hz | 6 Hz |
| Pulse Width | 33 $\mu s$ | 333 $\mu s$ |
| Wavelength | .06 in. | 0.6 in. |
| Transducers | | |
| Projector Length | 5 in. | 30 in. |
| Transducer Lengths | 30 in. | 300 in. |
| Widths | .06 in. | 0.6 in. |
| Resolution | | |
| Range | 1 in. | 10.in. |
| Azimuth | 1 in. | 10 in. |
| Disc | | |
| Video Frequency | 3.33 MHz | 1.82 MHz |
| Sync Signal | 1.11 MHz | 13.2 KHz |
| Beam Widths(at maximum range) | | |
| Projector Transducer | 6 in. | 100 in. |
| Receiving Transducers | 1 in. | 10 in. |

While presently preferred embodiments of the invention have been shown and described in particularity, it may be otherwise embodied within the scope of the appended claims.

What is claimed is:

1. A moving window sonar display system comprising a broad beam projective transducer and transmitter means for transmitting a sonar pulse to sonify an area, a plurality ($N_B$) of line-focus receiving transducers focused on adjacent strips of said area, an amplifier and detector means for and electrically connected to each of said receiving transducers, an electronic sampling switch connected to each of said amplifier and detector means and adapted to sequentially sample the output of each of said means $R_E$ times between successive sonar pulses, a magnetic storage means having at least one track and at least one write head associated with said track and electrically connected to said sampling switch, said storage means adapted to rotate $360°\pm\phi$ between successive sonar pulses and to store the output from said switch as groups of $N_B$ signals at nonadjacent locations between successive pulses and $N_B$ signals of equal $R_E$ from previous and subsequent pulses at adjacent locations thereon, said storage means also including a read head associated with said track electrically connected to a cathode ray display means for transferring said stored signals from said storage means to said display.

2. A sonar system as set forth in claim 1 wherein said electronic sampling switch comprises a multiplexer and said system includes a video amplifier means wherein said multiplexer is connected to said write head through said video amplifier means.

3. A sonar system as set forth in claim 1 wherein said magnetic storage means comprises a magnetic disc having first and second tracks, said first track being adapted to receive the output signals from said sampling switch and said second track being adapted to permanently store a synchronization signal.

4. A sonar system as set forth in claim 1 wherein said sampling switch comprises a bucket brigade storage circuit and a trigger generator, said storage circuit having $N_B$ channels and each of said channels including $R_E$ storage elements, each of said channels being electrically connected to an associated amplifier and detector means and each of said storage elements being electrically connected to said trigger generator, and said trigger generator being adapted to supply an electrical pulse to said elements $R_E$ times between successive sonar pulse, the output of said storage circuit being electrically connected to said write head.

5. A sonar system as set forth in claim 1 including $N_B$ sampler switches wherein each of said amplifier/detector means is connected to an associated sampler switch and wherein said magnetic storage means includes at least $N_B$ tracks, $N_B$ read heads and $N_B$ write heads, each of said amplifier switches being electrically connected to an associated write head for storing the signals associated with said channel on said associated track; and including a second electronic sampling switch connected to each of said read heads and adapted for sequentially sampling the signals read from each of said tracks $R_E$ times, said sampling switch being electrically connected to said display means.

6. A moving window sonar display system comprising a broad beam projecting transducer and associated transmitting means for transmitting successive sonar pulses to sonify an area; $N_B$ line-focusing receiving transducers focused on adjacent strips of said sonified area; $N_B$ associated amplifier and detector means electrically connected to each of said receiving transducers; a multiplexer electrically connected to the output of each of said amplifier and detector means for sequentially sampling the output of each detector means $R_E$ times between successive sonar pulse, each of said sampled signals defining a range element; a magnetic storage disc having at least first and second tracks, said first track having at least $R_E\pm1$) $\times$ (no. of sonar pulses to be displayed) storage locations, and including at least one write head and at least one read associated with said first track, said write head being electrically connected to said multiplexer, said storage disc being adapted to rotate $360°\pm\phi$ between succesive sonar pulses to store output signals as $N_B$ groups at ($R_E\pm1$) nonadjacent locations during one rotation and to store successive pulse signals of equal range at adjacent locations in sequence order of the pulse; said second disc track adapted to permanently store a synchronization signal thereon; said read head being electrically connected to a cathode ray display means for transferring all of said stored signals from said disc in a $360°\pm\phi$ rotation to provide a moving window display thereon, and a sync-head associated with said second track for reading signals therefrom and electrically connected to said transmitter means, said multiplexer and said display means for synchronization of said system.

7. A sonar system as set forth in claim 6 including a frequency divider circuit electrically connected to receive the output from said sync-head and electrically connected to said multiplexer and said transmitter means; a frequency multiplier circuit electrically connected to receive the output signal from said sync-head and multiply it $N_B$ times, said multiplier circuit being electrically connected to said multiplexer; and a time varied gain circuit electrically connected to said frequency divider circuit and to each of said amplifier detector means.

8. A sonar system as set forth in claim 7 including a selective erase generator and erase head associated with said first track, said generator being electrically connected to said frequency divider circuit and said erase head.

9. A moving window sonar display system comprising a broad beam projecting transducer and associated transmitting means for transmitting successive sonar pulses to sonify an area; $N_B$ line-focusing receiving transducers focused on adjacent strips of said sonified area; $N_B$ associated amplifier and detector circuits electrically connected to said transducers; a storage circuit and trigger generator, said storage circuit having $N_B$ channels and each of said channels having $R_E$ storage elements, each of said channels being electrically connected to and associated amplifier and detector circuit and each of said storage elements being connected to said trigger generator, said trigger generator being adapted to supply an electrical pulse to said elements $R_E$ times between successive sonar pulses, each of said channels being connected to an output; a magnetic storage disc having at least first and second tracks, said first track having at least ($R_E\pm1$) $\times$ (no. of sonar pulses to be displayed) storage locations, and at least one write head and at least one read head associated with said first track, said write head being electrically connected to the output of said storage circuit, said storage disc being adapted to rotate $360°\pm\phi$ between each successive sonar pulse to store signals as $N_B$ groups at $R_E\pm1$ nonadjacent locations during one $360°\pm\phi$ rotation and to store successive pulse signals of equal $R_E$ at adjacent locations in sequence order of the pulse, said second track being adapted to permanently store a synchronization signal thereon and having an associated sync-head, said read head being electrically connected to a cathode ray display means; a frequency divider circuit electrically connected to said sync-head and to said display means, said transmitter means and said trigger generator for providing selective frequencies thereto.

* * * * *